US006522231B2

(12) United States Patent
Buswell

(10) Patent No.: US 6,522,231 B2
(45) Date of Patent: Feb. 18, 2003

(54) POWER CONVERSION SYSTEMS UTILIZING WIRE CORE INDUCTIVE DEVICES

(76) Inventor: Harrie R. Buswell, 132 Lorraine Ct., Berea, KY (US) 40403

(*) Notice: Subject to any disclaimer, the term of this patent is extended or adjusted under 35 U.S.C. 154(b) by 0 days.

(21) Appl. No.: 09/948,778

(22) Filed: Sep. 10, 2001

(65) Prior Publication Data

US 2002/0064062 A1 May 30, 2002

Related U.S. Application Data

(63) Continuation of application No. 09/473,187, filed on Dec. 28, 1999, which is a continuation-in-part of application No. 09/203,105, filed on Nov. 30, 1998, now Pat. No. 6,239,681, and a continuation-in-part of application No. 09/309,404, filed on May 10, 1999, now Pat. No. 6,268,786.

(51) Int. Cl.$^7$ .......................... H01F 27/02; H02M 3/24
(52) U.S. Cl. .......................................... 336/83; 363/89
(58) Field of Search ..................... 363/89, 125; 336/84, 336/85, 83, 92, 233, 206, 209, 229

(56) References Cited

U.S. PATENT DOCUMENTS

| | | | | |
|---|---|---|---|---|
| 414,266 A | * | 11/1889 | Thomson | 336/83 |
| 499,852 A | * | 6/1893 | Pfannkuche | 336/175 |
| 619,760 A | | 2/1899 | Kinraide | |
| 1,597,901 A | | 8/1926 | Kent | |
| 2,043,346 A | | 6/1936 | Buckley | |
| 2,179,661 A | | 11/1939 | Jones | |
| 2,962,679 A | | 11/1960 | Stratton | |
| 3,247,422 A | | 4/1966 | Schultz | |
| 3,304,599 A | | 2/1967 | Nordin | |
| 3,324,233 A | | 6/1967 | Bryant et al. | |
| 3,350,670 A | | 10/1967 | Strauch | |
| 3,579,088 A | | 5/1971 | Fletcher | |
| 3,720,897 A | | 3/1973 | Feather et al. | |
| 4,004,251 A | | 1/1977 | Hesler et al. | |
| 4,035,751 A | | 7/1977 | Walthew | |

(List continued on next page.)

FOREIGN PATENT DOCUMENTS

| | | |
|---|---|---|
| BE | 643817 | 5/1964 |
| DE | 352251 | 4/1922 |
| FR | 1068298 | 6/1954 |

*Primary Examiner*—Rajnikant B. Patel
(74) *Attorney, Agent, or Firm*—Miles & Stockbridge P.C.

(57) ABSTRACT

A power conversion system utilizes an inductive device having a magnetic core formed of a plurality of wires that extend through the inductive device, and beyond its electric windings. The ends of the wires are formed around the electric windings, meet, and are connected together enveloping the magnetic core and windings forming a complete magnetic circuit. The inductive device may be a transformer used in a power supply, inverter, or other device with two or more windings, a choke coil with only one winding used in a ballast, power supply, inverter, or other inductive device. The power conversion system may further include a rectifier, a filter, and a regulator a so called analog system or components as in a switch mode system. In one embodiment of the power conversion system one or all of the rectification, filtering or regulation components or other components may be positioned within a housing formed by the magnetic core to provide physical protection and protection from the intrusion of electromagnetic interference from external sources.

21 Claims, 2 Drawing Sheets

U.S. PATENT DOCUMENTS 4,089,049 A 5/1978 Suzuki et al.
4,169,964 A 10/1979 Horvath et al.
4,204,890 A 5/1980 Irie et al.
4,484,171 A 11/1984 McLoughlin
4,491,903 A 1/1985 Montague
4,871,925 A 10/1989 Yamauchi et al.
4,897,916 A 2/1990 Blackburn
4,946,519 A 8/1990 Honda et al.
5,028,846 A 7/1991 Lesea
5,069,731 A 12/1991 Yoshizawa et al.
5,181,004 A * 1/1993 Johnson ...................... 336/198
5,211,767 A 5/1993 Shigeta et al.
5,268,663 A 12/1993 Takeuti et al.
5,486,803 A 1/1996 Igarashi et al.
5,676,770 A 10/1997 Sato et al.
5,821,843 A 10/1998 Mamada et al.
5,838,220 A 11/1998 Hagberg
5,847,634 A 12/1998 Korenivski et al.
5,917,396 A 6/1999 Halser, III
5,986,908 A 11/1999 Sugimori et al.
6,239,681 B1 * 5/2001 Buswell ...................... 336/83

* cited by examiner

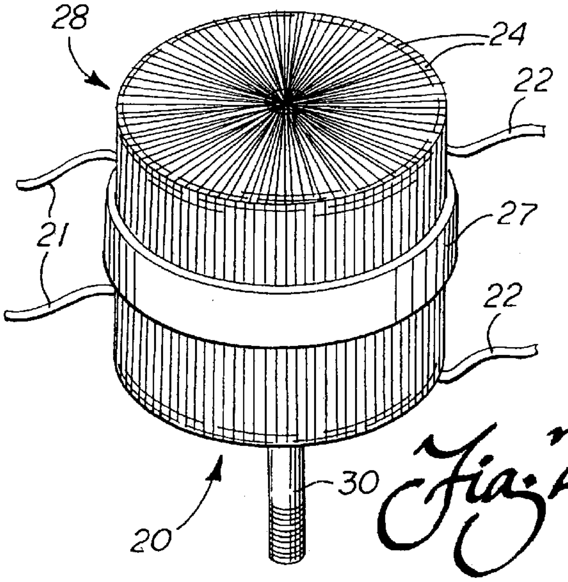
Fig. 2
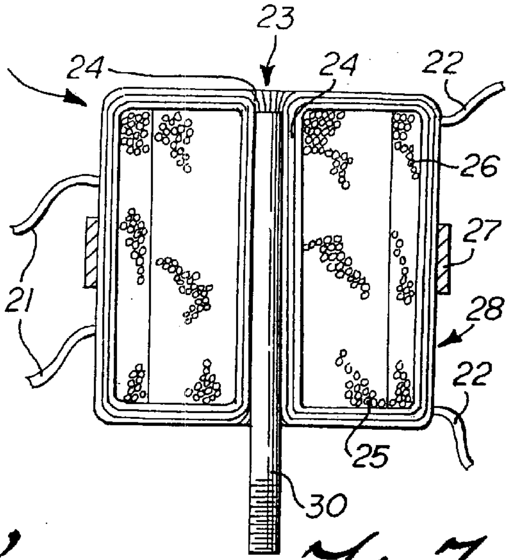
Fig. 3
Fig. 7a
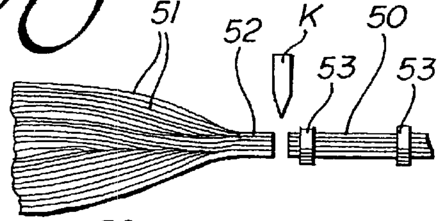
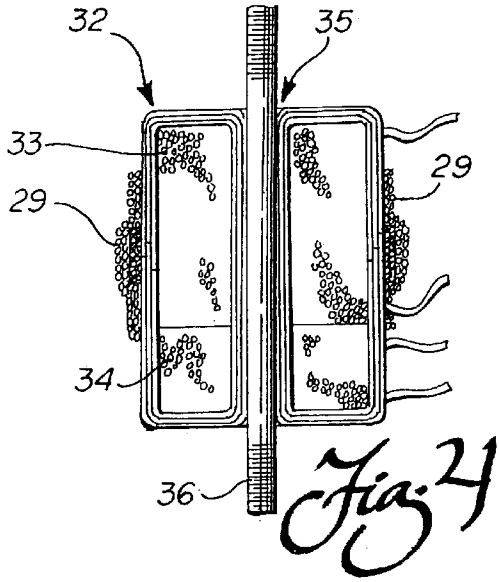
Fig. 4
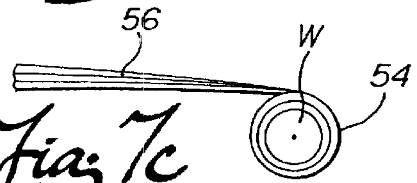
Fig. 7c
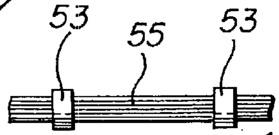
Fig. 7d
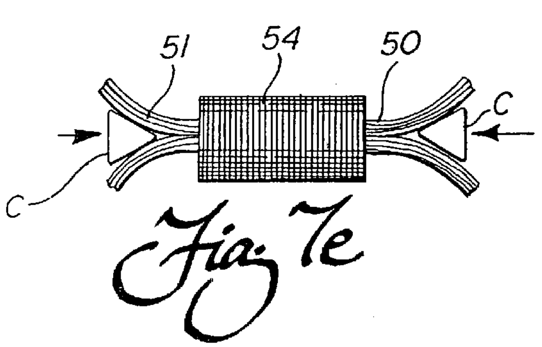
Fig. 7e
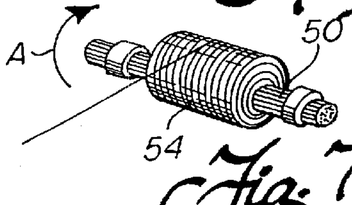
Fig. 7b

POWER CONVERSION SYSTEMS UTILIZING WIRE CORE INDUCTIVE DEVICES

CROSS REFERENCE TO RELATED APPLICATIONS

This application is a continuation of application Ser. No. 09/473,187, filed Dec. 28, 1999 which is a continuation-in-part of application Ser. No. 09/203,105 filed Nov. 30, 1998 (now U.S. Pat. No. 6,239,681) and a continuation-in-part of application Ser. No. 09/309,404 filed May 10, 1999 (now U.S. Pat. No. 6,268,786).

FIELD OF THE INVENTION

The present invention relates to the field of power conversion systems, and more particularly to power supplies, inverters, and ballasts utilizing wire core inductive devices.

BACKGROUND OF THE INVENTION

The overwhelming majority of electronic circuits require constant voltages to ensure appropriate operation. For example, many microcomputers require 5 volt and 12 volt sources capable of providing a current of 10 to 100 A. Other signal processing systems in which the currents produced vary with load conditions are required to maintain supply voltages at nearly constant levels (e.g., 5, 12, and 15 volts). In addition, many motor drives and control systems require dc supplies whose voltage levels are dynamically adjusted to meet desired operating conditions.

For portable systems, batteries may be used. More frequently, however, electronic circuits are energized by a circuit, or a power supply, which converts the alternating current waveform received from power lines (e.g., a 110 volt to 220 volt rms, 60-Hz sinusoid in the United States) to direct voltage of constant amplitude utilizing at least one transformer or inductive device. Often these systems power the device and charge the battery as well.

It is common and universal for low frequency application transformers and other inductive devices to be made up of a magnetic core comprising a plurality of sheets of steel, the sheets being die cut and stacked to create the desired thickness of a core. Individual sheets of selected thickness are oxide-coated, varnished or otherwise electrically insulated from one another in order to reduce/minimize eddy currents in the magnetic core. For many years the thickness (thus number of necessary pieces) of the stampings has been determined by a strict set of constraints-magnitude of eddy currents versus number of necessary pieces.

The magnetic core of a transformer or the like generally passes through the center of the electric winding, and closes on itself to provide a closed magnetic circuit. Since the magnetic core then supports the electric windings, it is natural that the core has also been used as the support for the transformer. That is to say, one attaches the magnetic core to a container or baseboard in order to support the transformer.

When a stack of metal sheets is used as the magnetic core for an inductive device, it is usual to provide a shape, such as an E with the electric windings on the center leg of the E. After the windings are in place, an additional stack of sheets usually in an I configuration is applied to connect the ends of the E, thereby completing the magnetic circuit. Using such a technique, it will be understood that the windings are necessarily wound separately, and subsequently placed on the magnetic core. The windings must therefore be large enough to slip onto the magnetic core.

Also, the shape of the windings is necessarily rectangular rather than circular which detracts from optimal operation. Such construction contributes to the inherent noisiness of an inductive device and necessarily the power conversion device, because the electric windings must be somewhat loose on the core. As a result, when an alternating voltage is applied to the electric windings, the sheets making up the core tend to vibrate with the alternating magnetic field or in sympathy in a subharmonic. Any resulting gaps and spaces between the electrical components and the magnetic components also reduce coupling and efficiency of action.

Transformers and other inductive devices inherently generate electromagnetic fields. Such fields external to the device lessen efficiency, as well as pose interferences to the immediately surrounding environment. Although the strength of these electromagnetic fields decreases with distance from the transformer, shielding of either the electromagnetic field source or the affected components is often required. As components in today's electronics are made more sensitive and their packaging more dense, susceptibility to electromagnetic interaction increases dramatically. To assure optimum performance of these components, stray electromagnetic fields must be minimized often at a substantial cost. As noted above, one manner in which these fields may be minimized is to provide shielding around the source in order to contain the electromagnetic fields and to prevent interference from external sources.

Thus, a need exists for an improved power conversion system which may be manufactured in an efficient and cost effective manner and which utilizes transformers or other inductive devices which provide a high level of efficiency and superior shielding capabilities.

SUMMARY OF THE INVENTION

Accordingly, it is a primary object of the present invention to provide a novel and improved power conversion system and related method that are particularly adapted to be manufactured in an efficient and cost effective manner, and which overcome the limitations of the prior art.

Another object of the present invention is to provide a power conversion system that is particularly adapted to utilize an inductive device having a magnetic core formed from a plurality of wires.

Yet another object of the present invention is to provide a power conversion system which provides superior shielding capabilities.

Still another object of the present invention is to provide a power conversion system which houses all of its components within a magnetic core of an inductive device.

It is another object of the present invention to provide a method of making a power conversion system utilizing a plurality of wires to form a magnetic core.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, there is provided an improved power conversion system which utilizes an inductive device having a magnetic core comprising a plurality of wires. The power conversion system can be any circuit that provides power with characteristics required by a load from an external power source with characteristics incompatible with the load, i.e., it makes the load compatible with the available external power source. Accordingly, the power conversion system may be any type of power supply, including but not limited to an analog power supply or a switch mode power supply, an inverter, a ballast, or the like.

An electric winding, or windings dependent upon the inductive device, is wound directly onto the plurality of wires forming the magnetic core. The ends of the wires forming the magnetic core are spread and formed over the electric windings, the two ends of the wires meeting to form a complete magnetic circuit. A band or other connector means holds the ends of the wires together. Advantageously, the wires formed in this manner envelop the electric windings and magnetic core to provide a shield substantially containing the electromagnetic fields emanating from the system and reducing the intrusion of electromagnetic fields from external sources. Additional shielding may be provided by binding at least a portion of the wires forming the shield with a transversely wound wire in place of the band.

In accordance with an important aspect of the present invention, the magnetic core of the inductive device may form a housing for some, or preferably all, of the remaining components of the power conversion system. For example, a typical analog power supply may include additional components such as a fuse, an on/off switch, a rectifier, a filter, and/or a regulator. In accordance with the present invention, these components would be housed within the housing formed by the magnetic core. In this manner, the inductive device, as well as the components of the power conversion system are physically protected and shielded against the intrusion of electromagnetic or radio frequency interferences from external sources. Further shielding can be accomplished by enclosing the interior of the transformer and the electronic components with shield plates.

The inductive device may include a mounting post bound within the plurality of wires forming the magnetic core and extending therefrom for supportably mounting the power conversion device. The mounting post may extend from either side or both sides of the magnetic core as desired. Also, the make-up of the magnetic core may be otherwise varied considerably. Wire of various diameters may be used to achieve greater density of the core; a few large wires may be spaced around the core to provide rigidity; and, one or more tubes may be incorporated into the core, the tubes carrying air or a fluid for cooling the inductive device and the power conversion device. The cooling tubes are preferably constructed of non-magnetic and non-electrical-conducting material.

In a further aspect of the invention, in accordance with its objects and purposes, a method of making a power conversion system includes the steps of forming the magnetic core of a plurality of wires, placing at least one electric winding along the length of the magnetic core, connecting the electric winding to the remaining components of the power conversion system, and shielding the inductive device by forming the wires of the magnetic core over the at least one electric winding to envelop the winding and form a complete magnetic circuit.

Still other objects of the present invention will become apparent to those skilled in this art from the following description wherein there is shown and described the preferred embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serves to explain the principles of the invention. In the drawings:

FIG. 2 is a perspective view of an inductive device, specifically a transformer, made in accordance with the present invention for use in a power conversion system;

FIG. 3 is a cross-sectional view of an inductive device for use in a power conversion system showing electric windings formed on a magnetic core of wires, the wires enveloping the electric windings and the core in accordance with the present invention;

FIG. 4 is a cross-sectional view of an alternate embodiment of an induction device showing electric windings formed beside one another on a magnetic core of wires;

FIG. 7*a* is an illustration showing the step of forming a magnetic core by gathering a plurality of wires pulled from a creel to form a bundle, securing the wires with bands, and severing the bundled wires;

FIG. 7*b* is an illustration showing the step of forming an electric winding directly on the magnetic core;

FIGS. 7*c* and 7*d* are illustrations showing an alternate method for forming a magnetic core by winding one or a plurality of wires on a spindle, and severing the wound wires to form the core; and FIG. 7*e* is an illustration showing the step of shielding a transformer by forming a plurality of wires of the magnetic core over electric windings to envelop the windings and form a complete magnetic circuit.

Reference will now be made in detail to the present preferred embodiment of the invention, an example of which is illustrated in the accompanying drawings.

DETAILED DESCRIPTION OF THE PREFERRED EMBODIMENT

Figure 1:
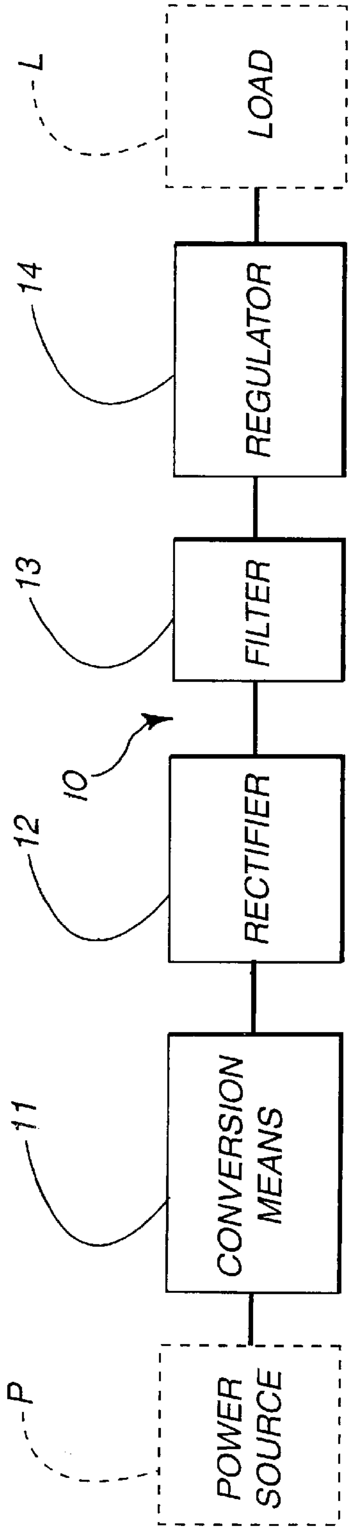
FIG. 1 is a block schematic diagram of a typical power conversion system.

For purposes of illustration and description of the present invention, reference is now made to FIG. 1 showing the present preferred embodiment of a power conversion system 10. The preferred power conversion system 10 includes a conversion means 11, a rectifier 12, a capacitor filter 13, and a regulator 14. However, in accordance with the broadest teachings of the present invention, the power conversion system 10 can be any circuit generally known in the field of power conversion systems that provides power with characteristics required by a load L from an external power source S with characteristics incompatible with the load L, and wherein the conversion means 11 is any type of inductive device (e.g. a transformer, an inverter, a ballast) having a magnetic core 23 formed of a plurality of wires 24.

As shown in FIG. 2, for example, the conversion means 11 of the present preferred embodiment is a transformer 20 having leads 21 for connecting a power source P (not shown) to the primary winding of the transformer 20, and leads 22 for connecting the secondary winding to a load L (not shown). Those skilled in the art will realize that designation of primary and secondary windings is somewhat arbitrary, and that one may use the leads 22 for connection to the power source P, and the leads 21 for connection to the load L. The designations of "primary" and "secondary" are therefore used herein as a convenience, and it should understood that the windings are reversible.

As best shown in FIG. 3, a magnetic core 23 of the transformer 20 is made up of a plurality of wires 24 rather than the conventional sheets of steel. As is usual, however, the electric windings 25 and 26 are received on the magnetic core 23. The plurality of wires 24 utilized to form the magnetic core 23 extend outwardly therefrom and are further formed around and envelop the electric windings 25 and 26. The ends of the plurality of wires 24 meet, and are held together by a band 27 forming a complete magnetic circuit. The leads 21 and 22 pass between the plurality of wires 24 to connect to the electric windings 25 and 26, respectively.

Importantly, the use of finer core wires 24 and the very small but distributed gaps brought about by the ends of the wires meeting, allow the transformer 20 of the present preferred embodiment or other conversion means 11 to operate at higher frequencies than typical sheet-type magnetic core devices. Advantageously, the transformers 20 or other conversion means 11 may be utilized in switchmode power supplies and other devices requiring higher frequencies. For example, the conversion means 11 may include a switching means (not shown) for controlling the phase and frequency of an output from extremely low frequencies of below three kilohertz up to and including low frequencies of between 30 to 100 kilohertz or more.

In accordance with another important aspect of the present invention, the wires 24 form a shield 28 substantially containing electromagnetic fields emanating from the transformer 20 and reducing the intrusion of electromagnetic fields including electromagnetic interference and/or magnetic flux from external sources. Additional shielding may be provided as shown in FIG. 4 by binding at least a portion of the wires forming the shield 28 with a transversely wrapped wire 29. Preferably, the wire 29 is a fine iron or steel wire for binding the ends of the wires 23 or at least a portion of the shield 28, and thus replacing the band 27.

Referring back to FIG. 3, a mounting post 30, preferably threaded, may be extended from the bottom of the transformer 20 providing a convenient mounting means for the transformer 20. Centrally of the magnetic core 23, the mounting post 30 is held in place simply by being embedded within the plurality of wires 24 forming the magnetic core 23. Of course, the mounting post 30 may support the transformer 20 from below, as illustrated in FIGS. 2 and 3, or alternatively may extend from the top of a transformer 32 with the transformer 32 depending from the mounting post 30 (not shown).

As shown in FIG. 4, an alternate embodiment of a transformer 32 for use in the power conversion system 10 in accordance with the present invention is similar to the transformer 20, but electrical windings 33 and 34 are positioned beside one another on magnetic core 35 instead of one upon the other as in the transformer 20. In addition, the mounting post 36 extends from both the top and bottom of the transformer 32. Necessarily, the transformer 32 may be mounted from either top or bottom, or from both.

While the use of a mounting post provides a readily convenient manner by which to mount a transformer, one may wish to utilize the transformer of the present invention in a conventional setting, wherein the mounting post is not convenient. Conventional transformers are typically supported by their magnetic core structure. Since the magnetic core of the transformer 20 of the preferred embodiment of the present invention is not adapted to provide similar support, one might utilize the mounting posts 30 or 36 to fix the transformer to a bracket that can be mounted as a conventional transformer. Alternatively, the magnetic core area may have no stud, but be filled solely with core wires with mounting secured by other means, such as external strapping.

Figure 5:
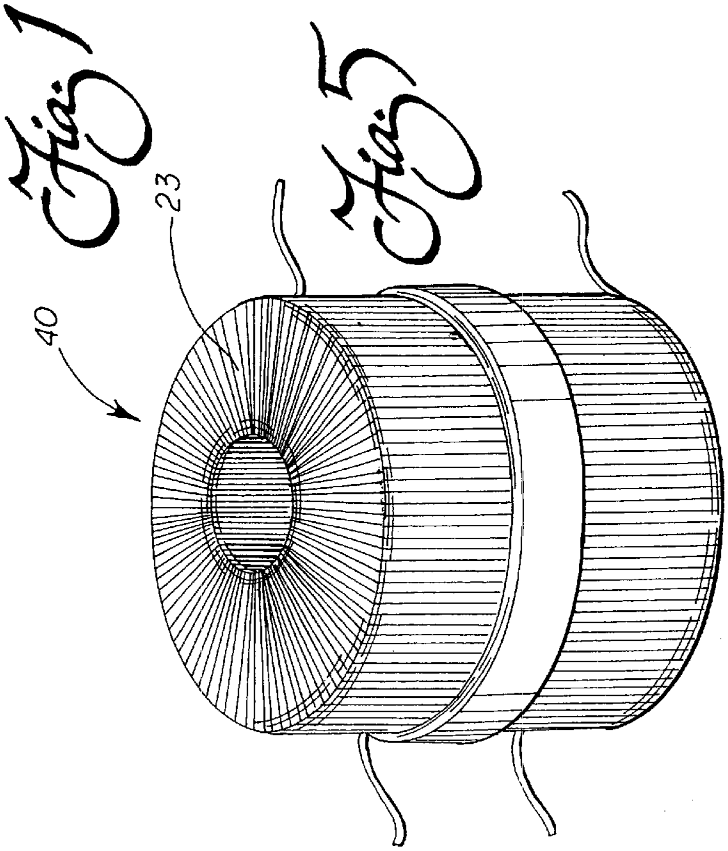
FIG. 5 is a perspective view of an inductive device for use in a power conversion system showing the housing formed by the magnetic core.

In accordance with another important aspect of the present invention, the magnetic core 23 of the inductive device 20 may form a housing 40 to house some, or preferably all, of the remaining components of the power conversion system 10 (see FIG. 5). For example, a typical analog power supply may include additional components (not shown) such as a fuse, an on/off switch, a rectifier, a capacitor filter, and/or a regulator. In accordance with the present invention, these components or at least some of these components are housed within the housing 40 formed by the magnetic core 23. In this manner, the inductive device 20, as well as the remaining components which comprise the power conversion system 10 are physically protected and shielded against the intrusion of electromagnetic interference and magnetic flux from external sources.

Figure 6:
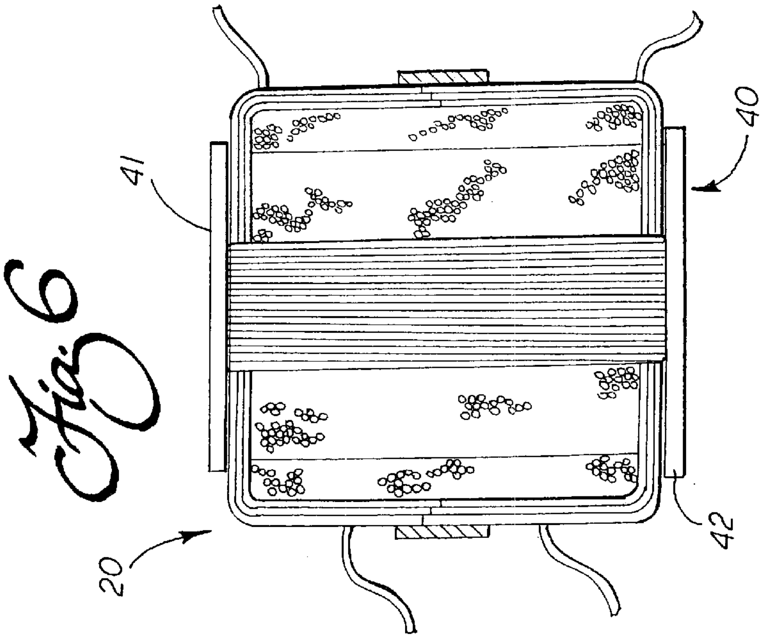
FIG. 6 is a cross-sectional view of an inductive device for use in a power conversion system showing the housing formed by the magnetic core and the electric windings, the wires enveloping the electric windings and the core in accordance with the present invention.

In accordance with the broadest possible teachings of the present invention, the housing 40 can generally be formed in any size and shape. For purposes of illustration and description, the present preferred housing 40 is a generally cylindrical housing open at both ends to an ambient environment. As shown in FIG. 6, plates 41, 42 may be secured over the openings to provide additional physical protection and shielding against the intrusion of electromagnetic interference and magnetic flux from external sources.

As indicated above, the remaining components of the power conversion system 10 shown in FIG. 1 include the rectifier 12, the capacitor filter 13, and the regulator 14. Each of these components are well known in the art and may be utilized in accordance with the teachings of the present invention in any known form or combination dependent upon the required design parameters of the power conversion system 10. For example, the rectifier 12 can be a half-wave rectifier utilizing a single diode to convert the sinusoidal input waveform into a unidirectional though not constant waveform, or a full-wave rectifier which comprises two half-wave rectifiers. Similarly, the capacitor filter 13 can be a simple capacitor shunted across the load L in order to decrease the ripple voltage, or a more efficient capacitor-input filter or choke-input filter wherein more than one passive element is utilized. The regulator 14 can be a Zener diode, a combination of discrete components including a differential amplifier and pass transistor, a monolithic regulator such as the Motorola MC7800C series of fixed-voltage regulators, for example, or one of many different switching regulators. These examples are presented only to illustrate a few of the numerous types of rectifiers, filters and regulators which may be combined with an inductive device in accordance with the teachings of the present invention to form the novel power conversion system and are not meant to be an exhaustive list.

In a further aspect of the invention, a method of making a power conversion system includes the steps of forming a magnetic core of a plurality of wires, placing at least one electric winding along the length of the magnetic core, connecting the electric winding to an external power source and at least one passive element, and connecting the passive element to an external load.

In accordance with that method, FIG. 7*a* shows the step of forming a magnetic core 50 by gathering a plurality of wires 51 pulled from a creel (not shown) to form a bundle 52, and severing the bundle at a predetermined length with a knife K or the like. The resulting magnetic core 50 is held together by bands 53 or the like. It will be recognized that the plurality of wires 51 pulled from the creel may all be the same diameter or may be a combination of different diameters. As noted above, the use of different diameter wires allows for a more dense packing of the magnetic core 50, thereby improving its magnetic characteristics.

In accordance with the present preferred method, at least one electric winding 54 is next placed on the magnetic core 50. The electric winding may be formed by winding a coil of wire on a spindle, in accordance with the prior art, for slipping over a magnetic core. In accordance with an important aspect of the present preferred invention, however, the electric winding 54 is wound directly on the magnetic core 50, as shown by action arrow A in FIG. 7*b*. Advantageously, this direct placement of the electric winding 54 onto the magnetic core 50 in a circular manner provides a more efficient, and thus more economical method of manufacturing by eliminating steps in the prior art manufacturing methods.

Another advantage is that, by winding the electric winding 54 directly on the magnetic core 50, the electric winding 54 assists in binding the wires which form the core tightly together, thereby offering several mechanical and electrical advantages. These advantages include tighter magneto-electric coupling, greater efficiency, and reduced vibrational noise from the core 50.

FIG. 7*c* illustrates an alternate method for forming a magnetic core in accordance with the present invention. In the alternate method, a magnetic core 55 is formed by feeding one wire or a plurality of wires 56 to a winder W. Since a winder W of this type may be very high speed, it is practicable to use thin wires to form the magnetic core 55. However, one may also use a variety of wires having different diameters, the wires being geometrically sized and arranged to be densely packed and drawn onto the form at the same time. The plurality of wires 56 are removed from the winder W, severed at a predetermined length, and straightened as shown in FIG. 7*d*. By appropriately deforming the wound wires before severing, the ends will be substantially square or the winding skein can have several straight sides essentially forming a triangular cross-section. As in the preferred method shown in FIG. 4*a*, bands 53 or the like hold the plurality of wires 56 together thus forming the magnetic core 55.

With the electric winding 54 in place on the preferred magnetic core 50, the next step in the preferred method is to shield the inductive device by forming the plurality of wires 51 extending from the magnetic core 50 around the electric winding 54 to envelop the winding and form a complete magnetic circuit. FIG. 7*e* illustrates one manner of forming the plurality of wires 51, for example, by using a pair of cones C to spread the wires generally radially. Alternatively, finer wires can be spread by centrifugal force. Conventional means may then be used to form the wires 51 completely around the electric windings 54 to form a shield generally as shown in FIG. 2.

Those skilled in the art will recognize that the magnetic core of an inductive device preferably forms a complete magnetic circuit. As best shown in FIGS. 2 and 3, the forming of the plurality of wires 24 extending from the magnetic core 23 around the electric windings 25, 26 causes the ends of the wires to meet. In accordance with the inventive method, the wires 24 are preferably prepared by having their ends cleaned; then, when the ends of the wires meet, they are held together by the band 27. Alternatively, the band 27 may be used in conjunction with or be replaced by a fine iron or steel wire 29 wrapped transversely around the device 20 or augmented by a magnetic metal bearing epoxy or glue.

In addition to providing the desired complete magnetic circuit, it will be seen that the entire inductive device, e.g., transformer 20, is thus covered by the wires 24 forming shield 28. The device made in accordance with the method of the present invention may therefore be used in electrically noisy environments without adversely affecting or being adversely affected by surrounding components.

It will therefore be understood that the present invention provides a highly efficient method for making a power conversion system 10 having a conversion means 20 having a magnetic core 23 formed of a plurality of wires 24. It should be noted that the core wires 24 of the conversion means 20 of the present invention may be made of substantially the same silicon and other steel that is used for conventional cores. Furthermore, the process of drawing the wire produces the same desirable grain structure, and in the proper direction, as is found in the present stamped sheets where it is desirable to use grain oriented silicon steel, for example. The wires of the present invention will be coated to be electrically insulated from one another to reduce eddy currents, and the diameter of the wires will be selected to reduce eddy currents.

The foregoing description of a preferred embodiment of the invention has been presented for purposes of illustration and description. It is not intended to be exhaustive or to limit the invention to the precise form disclosed. Obvious modifications or variations are possible in light of the above teachings. The preferred embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An electrical apparatus comprising:

an inductive device having a magnetic core including a portion of a plurality of wires, said portion forming a hollow housing, and at least one electric winding extending around said magnetic core, each of said plurality of wires substantially encircling said at least one electric winding; and an electrical component electrically connected to said inductive device and disposed within said hollow housing.

2. An electrical apparatus as recited in claim 1, and which is operative to convert alternating current to direct current.

3. An electrical apparatus as recited in claim 1, wherein said inductive device is a transformer.

4. An electrical apparatus as recited in claim 1, and which includes at least one of a rectifier, a filter and a regulator disposed within said hollow housing.

5. An electrical apparatus as recited in claim 1, wherein said hollow housing has an opening at one end.

6. An electrical apparatus as recited in claim 5, further comprising a plate substantially covering said opening.

7. An electrical apparatus as recited in claim 6, wherein said plate is an electromagnetic shield.

8. An electrical apparatus as recited in claim 1, wherein said hollow housing has openings at opposite ends thereof.

9. An electrical apparatus as recited in claim 8, further comprising respective plates substantially covering said openings.

10. An electrical apparatus as recited in claim 9, wherein each of said plates is an electromagnetic shield.

11. An electrical apparatus as recited in claim 1, wherein each of said plurality of wires includes a first end and a second end that substantially abut one another.

12. An electrical apparatus as recited in claim 11, wherein said first and second ends of each wire are secured in place.

13. An electrical apparatus as recited in claim 12, wherein said first and second ends of said plurality of wires are secured by a band.

14. An electrical apparatus as recited in claim 12, wherein said first and second ends of said plurality of wires are secured by a binding wire.

15. An electrical apparatus as recited in claim 12, wherein said first and second ends of said plurality of wires are secured by an epoxy.

16. An electrical apparatus as recited in claim 1, further comprising a mounting post disposed among said plurality of wires and extending from said plurality of wires.

17. An electrical apparatus as recited in claim 1, further comprising a coolant tube disposed within said magnetic core.

18. An electrical apparatus as recited in claim 1, further comprising a second electric winding extending around said magnetic core and wherein each of said plurality of wires substantially encircle said second winding.

19. An electrical apparatus as recited in claim 1, wherein said housing is cylindrical.

20. An electrical apparatus as recited in claim 1, wherein said at least one electric winding is in direct contact with said magnetic core.

21. An inductive device as recited in claim 1, wherein said plurality of wires include wires of different cross-sectional areas arranged to increase the density of said magnetic core.

* * * * *